United States Patent Office 3,597,443
Patented Aug. 3, 1971

3,597,443
METHOD FOR THE PRODUCTION OF ETHYLENE UREA
Milton Crowther, Salisbury, N.C., assignor to Proctor Chemical Company, Inc., Salisbury, N.C.
No Drawing. Filed Apr. 8, 1968, Ser. No. 719,735
Int. Cl. C07d 49/34
U.S. Cl. 260—309.7                                          7 Claims

ABSTRACT OF THE DISCLOSURE

Ethylene urea substantially free of water-insoluble by-products such as occur in conventional commercial ethylene urea is made by adding about 1 to 10% formaldehyde or an equivalent aldehyde donor to the reaction mass of urea and ethylene diamine as the mass cools down from maximum reaction temperature around 270° C. and before it reaches 200° C. The product is useful in forming formaldehyde adducts used in crease-proofing of textiles.

BACKGROUND OF THE INVENTION

Ethylene urea is commonly produced by strongly heating a mole of urea with a mole of ethylene diamine. Two moles of ammonia gas are evolved and the residue consists of cyclic ethylene urea. Usually, an excess of ethylene diamine is used and this excess is distilled off during the course of the reaction.

As the reaction proceeds, the urea first dissolves into the ethylene diamine to give a clear, colorless solution. Ammonia begins to evolve and the excess ethylene diamine is slowly distilled off until at about 145° C. the batch slowly becomes hazy. As temperature is increased, the haziness becomes more pronounced until at about 180° C. the batch is so thick with insoluble material that it is impossible to stir. To facilitate stirring, ethylene glycol or some other suitable high boiling solvent is normally added as a diluent. When the temperature reaches about 200° C., the insoluble material begins to dissolve and at 245–250° C., the batch is again clear. Heating is continued until the temperature reaches 270° C. The product is then vacuum stripped to remove any residual ethylene diamine or solvent and allowed to cool, still under vacuum until at some point above its melting point it is discharged.

Ethylene urea made in this fashion has always contained small quantities of impurities which are insoluble in water. Furthermore, when methylol derivatives are made of this ethylene urea by reacting with aqueous formaldehyde, the insoluble material remains undissolved and must be filtered out before the methylol derivatives is suitable for application to fabrics.

It would be helpful to the textile industry in its utilization of ethylene urea as a reactant in the formation of methylol derivatives for treatment of cellulosic fabrics to impart crease resistance to the fabrics or produce so-called durable press garments to avoid the insoluble by-products.

OBJECTS

A principal object of this invention is the provision of improvements in ethylene urea and methods for its manufacture. Further objects include the provision of:

(1) A new method for the production of ethylene urea by reaction at elevated temperatures of urea with ethylene diamine which mitigate formation of water-insoluble by-product material.

(2) Improved ethylene urea products that yield substantially no insoluble residue upon being dissolved in water.

(3) Improved ethylene urea, particularly suited for reaction with aqueous formaldehyde to form methylol derivatives suitable for treatment of fabrics to impart crease resistant properties.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description. It should also be understood the foregoing abstract of the disclosure is for the purpose of providing a non-legal brief statement to serve as a searching-scanning tool for scientists, engineers and researchers and is not intended to limit the scope of the invention as disclosed herein nor is it intended it should be used in interpreting or in any way limiting the scope or fair meaning of the appended claims.

SUMMARY OF THE INVENTION

These objects are accomplished in accordance with the invention by the addition of a step in the conventional method of producing ethylene urea by reaction at elevated temperatures above about 250° C. of urea with ethylene diamine, which step mitigates formation of water-insoluble by-product material which normally results in carrying out a conventional method. The improved step involves addition of a lower alkyl aldehyde yielding reagent to the product mass which results from the reaction of urea with ethylene diamine as the temperature of the product mass is reduced from the maximum reaction temperature and before such temperature goes below about 200° C. Advantageously, a formaldehyde donor is used as the aldehyde yielding reagent and its addition to the product mass is made when the mass is between about 200 to 220° C.

In the preferred methods of carrying out the new operations, the product mass during or subsequent to addition of the aldehyde yielding reagent is held at a temperature of 200 to 220° C. for a period of about 0.5 to 2 hours and sufficient of the reagent is added to provide in the product mass between about 1 to 10% of formaldehyde or its equivalent.

The success of the present invention is due, at least in part, to the discovery that the addition of the aldehyde yielding reagent in small quantity during the product mass cooling as indicated results in substantial elimination of the formation of water-insoluble by-products in the final desired ethylene urea. The exact reason for this is not known but an explanation is postulated as of possible aid in further understanding of the invention.

It is believed that reactions occurring in a mixture of urea and ethylene diamine heated to elevated temperatures can be represented by the following equation:

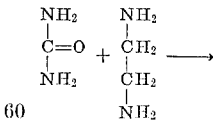

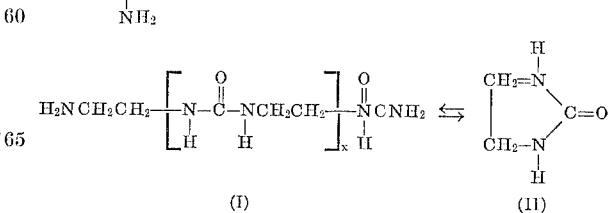

It is postulated that the white powdery material formed at about 145–200° C. is represented by I. X is very great and, as cyclization proceeds and X becomes smaller, the material becomes less viscous and finally at 270° C. the material is completely converted to the cyclic form and is a clear melt. With cooling, at some temperature below 210° C., a significant reconversion to the linear form begins to take place until when the batch is allowed to solidify, it contains chains sufficiently long to be insoluble.

This can be illustrated by pouring melted ethylene urea at about 220° C. into cold water. The solution will be essentially clear. Melted ethylene urea at lower temperatures poured into water will give increasingy hazy solutions. The lower the temperature of the melt, the more hazy the solution will be. Ethylene urea which has solidified will give a solution even more hazy than ethylene urea just above its melting point.

It is believed that the addition of formaldehyde arrests the reaction from II to I and tends to stabilize more of the product in the cyclic form. Any linear polymer of I type formed would tend to be of shorter chain length and would tend to be more water soluble.

DESCRIPTION OF PREFERRED EMBODIMENTS

The following details of operations in accordance with the invention and reported data illustrate the further principles and practice of the invention to those skilled in the art. In these examples and throughout the remaining specification and claims, all parts and percentages are by weight and all temperatures are in degrees centigrade unless otherwise specified.

Example 1

A glass reaction vessel was equipped with a mechanical stirrer, heating mantle, thermometer, distilling trap, and reflux condenser. To this equipment was charged 610 parts of urea, 840 parts of ethylene diamine, and 25 parts of diethylene glycol. The charge was heated and at 81° C. it was clear water-white solution. At 115° C. ammonia gas began to evolve. At 145° C. it became milky and at 171° C. it was almost too viscous to stir. During this heating, excess ethylene diamine was allowed to collect in the trap and was drained off from time to time.

Above 171° C. the charge gradually became less viscous until at 270° C. it was quite clear.

The heating mantle was removed and a vacuum of about 100 mm. was applied through the reflux condenser. Vacuum was continued while the charge was allowed to cool to 160° C. at which temperature the batch was discharged.

The distillate collected amounted to 158 parts and 893 parts of product were obtained.

A sample of the product was dissolved into water and the insoluble material filtered out and washed with water. After thoroughly drying, the insoluble materials were found to be 0.2% of the product.

Exmaple 2

To equipment, exactly the same as used in Example 1, but also provided with a nitrogen inlet, there were charged 610 parts of urea, 840 parts of ethylene diamine, and 25 parts of pure ethylene urea.

This charge was heated so that the temperature rose from 25° C. to 270° C. during eight hours. A total of 195 parts of distillate was collected during this period.

A vacuum of about 400 mm. was applied and the mantle lowered. As the temperature decreased, the vacuum was increased until at 210° C. the vacuum was about 100 mm.

The vacuum was released by bleeding in nitrogen gas. At 210° C., while the reaction mixture was blanketed under a stream of nitrogen, 145.2 parts of 37% Formalin was slowly added. The temperature decreased to 135° C.

A vacuum was again applied and the water was removed under a pressure of about 100 mm. up to a pot temperature of 200° C. The residue was allowed to cool to 140° C., discharged and recovered as product. It slowly solidified to a white crystalline mass. Water solutions of this material are slightly hazy, but become clear with slight warming.

Example 3

To the equipment, as described in Example 1, were charged the same chemicals.

The reaction was carried out in essentially the same manner as in Example 2. The product was stripped with vacuum. While cooling, and at 210° C., nitrogen was bled in to relieve the vacuum.

The nitrogen was fed through the reaction vessel in a gentle stream and while maintaining a temperature of 210° C., 145.2 parts of 37% Formalin were added dropwise to the reaction mixture. The formaldehyde reacted immediately and the water distilled from reaction zone and was collected in the distillation trap.

After all the formalin had been added, the temperature was held at 210° C. and the nitrogen stream was allowed to sweep out the last trace of water.

The batch was allowed to cool to 140° C. while under nitrogen, then discharged, allowed to solidify and recovered as product.

Water solutions of this product were perfectly clear.

Example 4

A reaction was run exactly as in Example 3 with the exception that 97.8 parts of 55% methyl formcel was substituted for the 145.2 parts of 37% Formalin. A mixture of water and methanol was removed in the same manner as the water in Example 3.

After solidifying, water solutions of the recovered product were clear.

EXAMPLE 5

Portions of 93.1 parts of each of the products prepared in Examples 3 and 4 were dissolved separately into 153.4 parts of 37% Formalin. The solutions were adjusted to pH 10.5 using 25% NaOH, then held at 60° C. for 30 minutes. The solutions were cooled to 25° C. and adjusted to pH 7.0 using dilute HCl. Both were diluted with water to a final weight of 296.2 parts. Both solutions were clear. The one from Example 3 was designated solution A and the other solution B.

EXAMPLE 6

An 86.9 part portion of the product of Example 1 was dissolved into 170.2 parts of 37% Formalin. The pH of this solution was adjusted to 10.5 and heated to 60° C. The solution was held at 60° C. for 30 minutes, cooled to 25° C., adjusted to a pH of 7.0, and diluted with water to 292 parts. This solution was filtered to remove insoluble material and was designated solution C.

EXAMPLE 7

Three fabric treating baths were made up. Each bath contained 3% magnesium chloride and 25% of one of the above formaldehyde adduct solutions A, B and C. These baths were padded onto white cotton broadcloth with pad rolls set for about 70% pick-up. The padded cloth was dried, then heated in an oven at 340° F. for 90 seconds.

The tensile strength loss, light reflectance, wash wear appearance (measured by the AATCC 88A–1964/T method), and wrinkle recovery (measured by the AATCC 66–1959/T method) of these treated samples were virtually identical.

DISCUSSION OF DETAILS

A variety of materials may be used as a lower alkyl aldehyde yielding reagent for use in accordance with the invention. Advantageously, the aldehyde yielding reagent is formaldehyde or acetaldehyde or a donor material which yields these aldehydes in the presence of the product mass from the reaction of urea with ethylene diamine at elevated temperatures between about 200 to 250° C. The use of formaldehyde in any of its various forms will serve to produce an ethylene urea product clearly soluble in water. Formalin or other aqueous formaldehyde products may be used. Other formaldehyde donors which are operative include: paraformaldehyde, trioxmethylene, trioxane, aqueous formaldehyde, methyl formcel, and ethyl formcel. Actaldehyde in aqueous solution will also work. When aqueous solutions are used, the water, of course, is distilled off as the solution is added.

The amount of formaldehyde or equivalent aldehyde donor used in conducting the new step in the manufacture of ethylene urea may be varied. Amounts of 5 to 6% by weight of the product mass to which the aldehyde donor is added seem to be ideal. Less than this, i.e., as little as about 1%, will produce beneficial effects. Operative results have also been obtained using amounts of aldehyde donor yielding up to 10% by weight of formaldehyde or its equivalent in the product mass. Quantities greater than 10% also appear operative although unnecessary to provide ethylene urea products completely free of water-insoluble materials.

The optimum conditions for addition of the formaldehyde or equivalent reagent has been found to be a dropwise or streamwise addition to the product mass over a period of about 0.5 to 2 hours while the product mass is at a temperature within the range 200 to 220° C. The most satisfactory results have been obtained using a temperature within the range 205 to 215° C. If a higher temperature is employed, the product tends to acquire some color and temperatures below the range appear to be less effective in reducing production of water-insoluble by-product material.

Although mixtures of aldehyde donors do not appear to offer any particular advantage, use of such mixtures is possible in order to reduce costs, provide some control upon the amount of volatile material removed during the addition and heating step of the invention or for other purposes.

No special equipment is required for carrying out the production of ethylene urea in accordance with the invention. As illustrated in the foregoing examples, a preferred procedure involves passage through the reaction mass or reaction vessel of nitrogen or equivalent inert gas as an aid in removing volatile materials formed in the operation. Obvious, when this technique is employed, the equipment must provide suitable means for injecting nitrogen or equivalent inert gas. Vacuum distillation of volatile materials is advisable so that equipment capable of being sealed against ambient atmosphere should be used and such equipment should include reflux condensers, distillation traps or comparable apparatus elements to provide efficient removal of volatile by-products.

CONCLUSION

The foregoing disclosure describes techniques for producing ethylene urea, particularly well suited for reaction with formaldehyde to form methylol derivatives to be used as fabric treating materials in the production of crease-proof fabrics and durable press garments. However, resulting ethylene urea which can be dissolved in water without leaving any substantial water-insoluble residue may be used for other purposes for which ethylene urea, otherwise known as 2-keto tetrahydroglyoxaline, is known to be useful.

The embodiments of the invention in which an exclusive property or right is claimed are defined as follows:

1. In the method of producing commercial grade ethylene urea by reaction at elevated temperature above about 250° C. of urea with ethylene diamine, the improvement which mitigates formation of water-insoluble by-product material that comprises adding about 1 to 10% by weight of a lower alkyl aldehyde yielding reagent to the reaction mixture as the temperature of the reaction mass is reduced from the maximum and before the temperature goes below about 200° C.

2. A method as claimed in claim 1 wherein said reagent is added while the reaction mixture is at a temperature between about 200 to 220° C.

3. A method as claimed in claim 2 wherein the reagent is added over a period of about 0.5 to 2 hours.

4. A method as claimed in claim 3 wherein the reagent is added in an amount to provide in the reaction mixture between about 1 to 10% formaldehyde.

5. A method as claimed in claim 1 wherein said reagent is formalin, paraformaldehyde, trioxymethylene, trioxane, methyl formcel or ethyl formcel.

6. A method as claimed in claim 1 wherein said reagent is acetaldehyde.

7. A method as claimed in claim 1 wherein said reagent is a formaldehyde donor, the maximum temperature of reaction of the urea with the ethylene diamine is about 270° C. and said reagent is added at a temperature between 200 and 220° C. and the reaction mixture is maintained at between 200 and 220° C. for between 0.5 and 2 hours before being cooled further for recovery of desired product.

References Cited
UNITED STATES PATENTS

| | | | |
|---|---|---|---|
| 2,373,136 | 4/1945 | Hoover et al. | 260—309 |
| 2,517,750 | 8/1950 | Wilson | 260—309 |
| 2,825,732 | 3/1958 | Wayland | 260—309.7 |
| 2,993,906 | 7/1961 | Sprenger et al. | 260—309.7 |

HENRY R. JILES, Primary Examiner

G. T. TODD, Assistant Examiner